Aug. 6, 1957     L. R. WOSIKA ET AL     2,801,518
GAS TURBINE Filed Sept. 17, 1952     9 Sheets-Sheet 8

INVENTORS
LEON R. WOSIKA
PAUL A. PITT
GRANT B. HODGSON
BY *Strauch, Nolan & Diggins*
ATTORNEYS

United States Patent Office 2,801,518
Patented Aug. 6, 1957

2,801,518

GAS TURBINE

Leon R. Wosika, Paul A. Pitt, and Grant B. Hodgson, San Diego, Calif., assignors to Solar Aircraft Company, San Diego, Calif., a corporation of California Application September 17, 1952, Serial No. 310,044

35 Claims. (Cl. 60—39.32)

The present invention relates to gas turbine power plants, and more particularly to gas turbine power plants of compact design and relatively small over-all dimensions having a high horsepower to weight ratio.

Gas turbine power plants are well known in the art, but attempts to provide compact power plants of small dimensions and high horsepower to weight ratio have, prior to this invention, been generally unsatisfactory. This lack of success is believed to have resulted from extreme overheating of the bearing structures, of the rotary elements, and of the casing structures resulting from drastic reduction in the sizes of these various parts to meet the requirements of compactness and small size. The present invention has overcome the problems to be faced in meeting these onerous requirements by a novel combination of cooperating elements to minimize the objectionable thermal effects causing distortion, disintegration and excessive wear of the necessary compressor-turbine elements, while at the same time maintaining desirable thermal relationships between the entering air and the combustion gases, and controlling the flow of this air and these gases in a manner to secure maximum power output obtainable from the potential and kinetic energy of the operating fluids.

It is a further object of this invention to provide a gas turbine power plant in which the rotating shafts and their bearings are substantially isolated from direct or close contact with the hot combustion gases, to provide nozzle vanes and rotor blades that extend into the path of the high temperature combustion gases to permit relatively free contraction and expansion of the exposed parts, and to confine the high temperature combustion gases definitely to the areas of relatively free expansion and contraction and thereby avoiding overheating and undesired expansion of the major relatively rotating parts and their bearing structures to maintain proper and adequate running clearances.

It is still another object of this invention to provide a compact gas turbine power plant with a protective shrouding arrangement enveloping portions of the plant carrying the hot combustion gases and to provide an air duct about the enveloped portions in which ambient air circulates to reduce the transmission of heat from the enveloped portions sufficiently that the power plant is well adapted for use in confined spaces in airplanes or on shipboard through which or in which operational personnel must pass or work.

It is also an important object of this invention to provide a gas turbine power plant with a protective shrouding arranged enveloping portions of the plant carrying the hot combustion gases, and to circulate ambient air in an air duct defined between the shrouding and the enveloped portions to carry off dangerous gases which might escape from the confined parts through undesired leaks from the enveloped portions, and to discharge the leaking gas at a point remote from the confined space in which the power plant is placed.

It is also an important object of this invention to provide an axial flow compressor-turbine power plant in which a peripherally arranged air inlet and lubricating oil assembly provides cool lubricating oil, and in which the combustion chamber is disposed in laterally off-set, longitudinally extending relation to the axis of the compressor and turbine in a peripheral depression provided between opposed ends of the air inlet and cooling assembly.

A further object of this invention resides in providing a gas turbine power plant with an improved cooling system to effectively protect the gear box of such a power plant from the high temperature of the operating air of the plant.

A further object of this invention resides in providing a gas turbine power plant having an annularly arranged side air intake axial flow compressor and a coaxially aligned axial flow turbine disposed at the inlet end of the compressor, with a laterally off-set folded back combustion chamber, and inlet and outlet passages for air to the compressor arranged so that the inlet air does not contact the combustion chamber or its exhaust passage, thereby avoiding preheating of the inlet air and cooling of the combustion gases and the incident decrease in efficiency produced by such preheating and cooling.

Still another object of the present invention is to provide an improved multi-stage compressor having a multi-stage rotor of extremely simple sectional design on which the sections may be quickly and readily assembled to provide a compressor assembly of the desired number of stages and yet be sufficiently strong to withstand extremely high shock loads.

Still another object of the present invention resides in providing an axial flow compressor-turbine power plant having a compressor outlet scroll located adjacent the outlet and bearing of the compressor, and providing this bearing with an air shield located to circulate air at substantially ambient air temperature to extract heat from the adjacent compressor parts and form a heat insulating barrier between the compressor outlet scroll and the housing of the compressor outlet end bearing.

Further objects of the invention will appear as the description proceeds in connection with the appended claims and the attached drawings, wherein:

Figure 17 is a diagrammatic illustration of the lubricating system of the gas turbine power plant of Figure 1.

Figure 1:
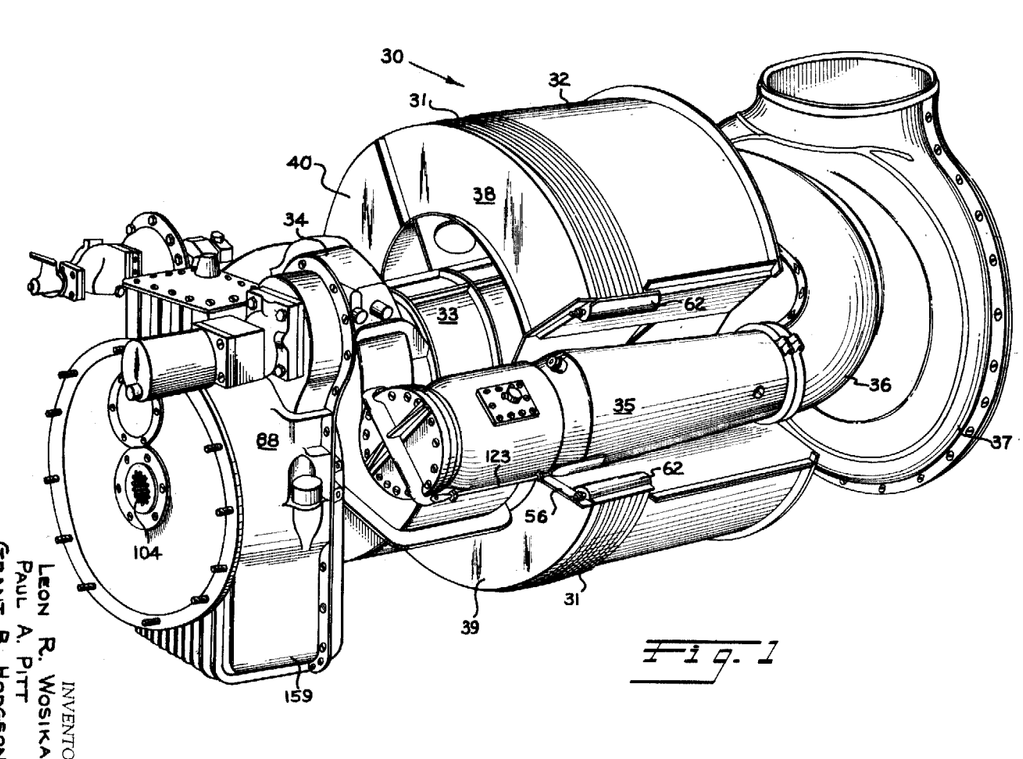
Figure 1 is a perspective view in elevation of a gas turbine power plant assembly embodying the principles of the present invention.
Figure 2:
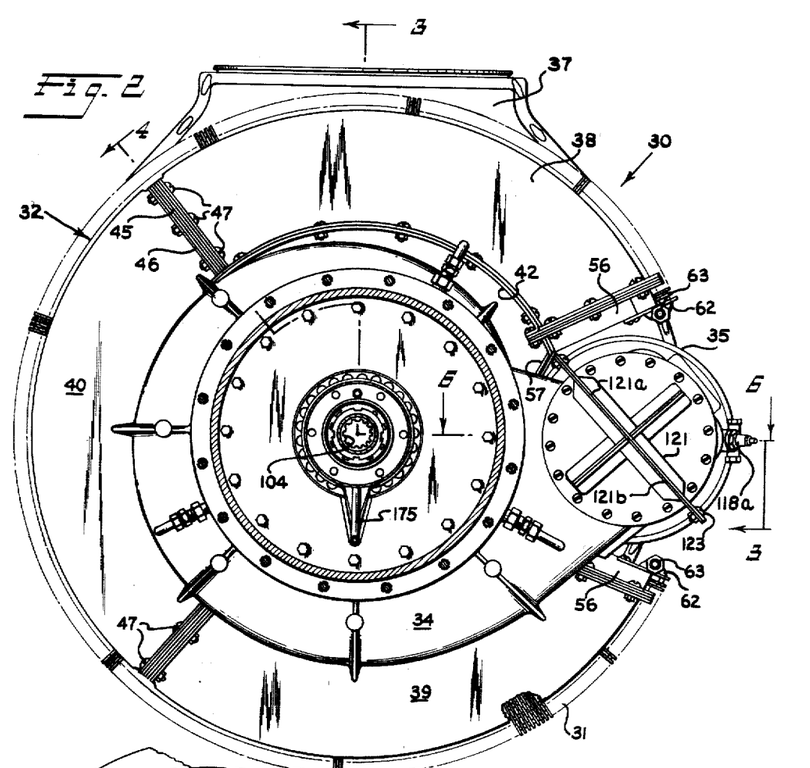
Figure 2 is a transverse sectional view of the gas turbine power plant of Figure 1 taken in a plane between the compressor outlet scroll and the gear box along the line 2—2 of Figure 3.

With continued reference to the drawings wherein the same reference numerals are used throughout the several views to indicate the same parts, the gas turbine power plant of this invention is indicated generally by the numeral 30, and is of the axial flow type. With particular reference to Figure 1 for a ready appreciation of the disposition of the several components of the power plant which are considered fully hereinafter, air enters the power plant in passing radially over a bank of finned oil-cooling tubes 31, disposed in an inlet opening at the left end of a silencer casing 32, and flows axially through the casing to the right to radially enter the side entry of an axial type compressor 33, and then flows axially to the left through the compressor to discharge, at augmented pressure, into a compressor outlet scroll 34, where its flow is reversed again through smoothly curving directing vanes in the scroll casing, so that it flows to the right through a combustion chamber 35, nested between radially opposed ends of the casing 32, on its way to a gas turbine inlet scroll 36, and to exhaust at the turbine exhaust scroll 37.

The power plant of this invention was conceived to meet the onerous task of providing a power plant that can be installed below decks and in a very limited room space on a ship, or in an aircraft to drive auxiliary equipment, and in general for installations in which a low weight to horsepower ratio, and a low length to horsepower ratio are imperative, and where due regard must be paid to the comfort and safety of the operating personnel. The combination of cooperating parts of the power plant 30, disclosed hereinafter, will make evident how the exacting conditions have been met, and without necessitating external cooling equipment which would add to the weight of the power plant, and depart from its structural simplicity and ease in maintenance.

The silencer casing 32, is of muff type, that is, it does not extend a full circle about the compressor 33, so that space is provided between the opposed ends of the casing to receive the combustion chamber casing 35.

Figure 3:
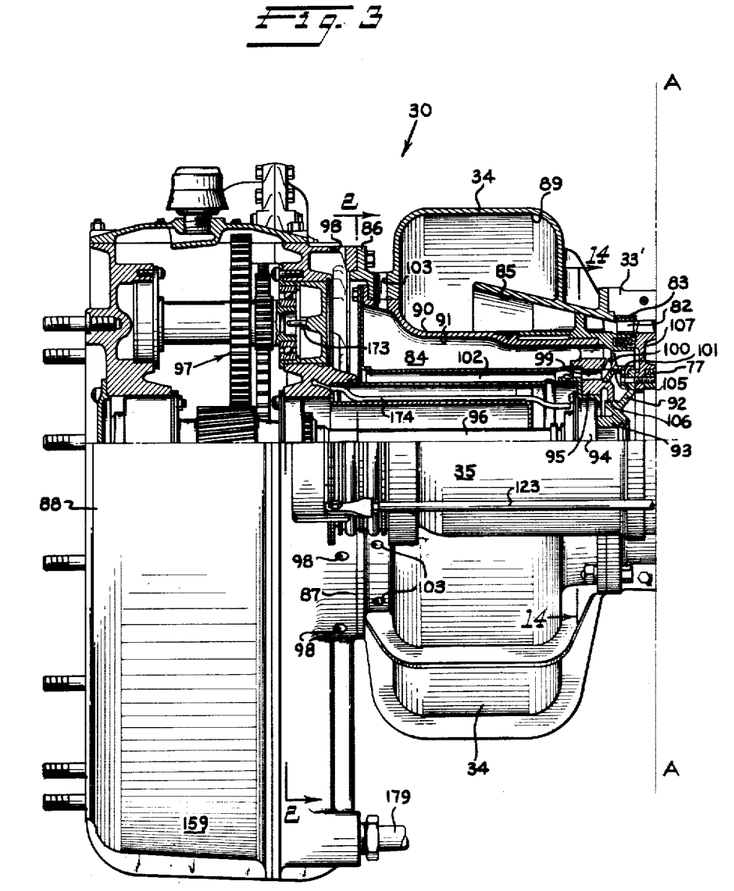
Figures 3, 4 and 5 when disposed in side by side relation constitute a longitudinal sectional view partially in elevation of the gas turbine power plant of Figure 1, Figures 3 and 5 being taken substantially along the line 3—3 of Figure 2 and Figure 4 being taken substantially along the line 4—3 of Figure 2.
Figure 4:
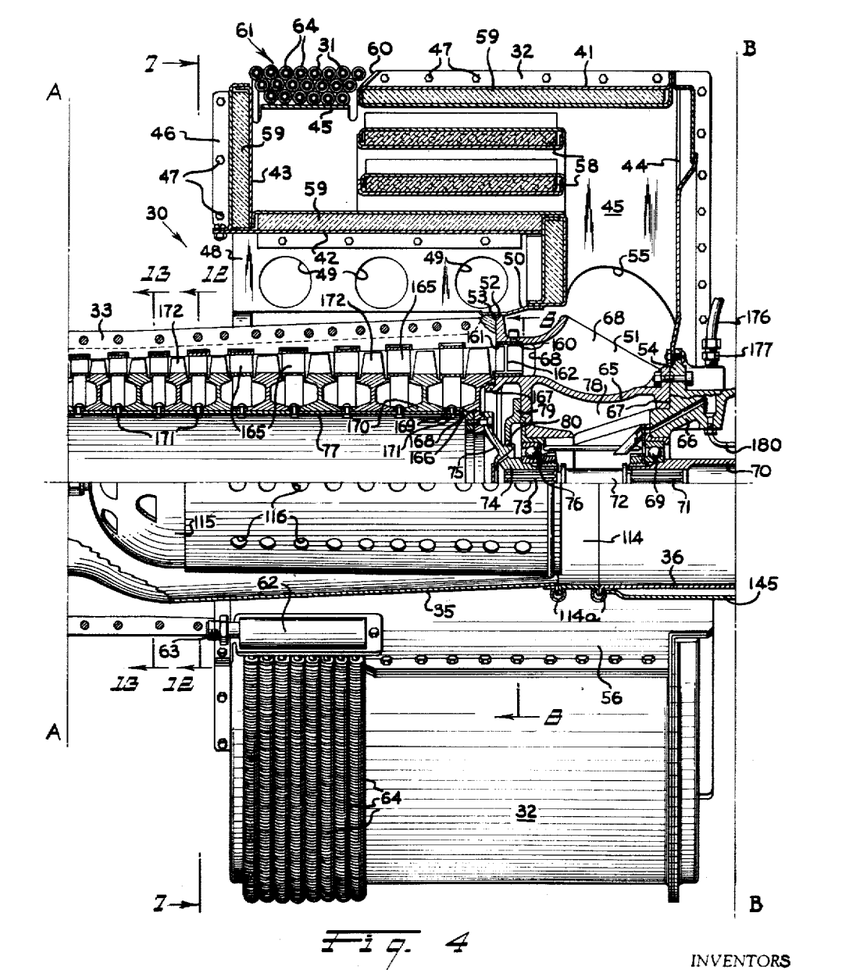
Figure 5:
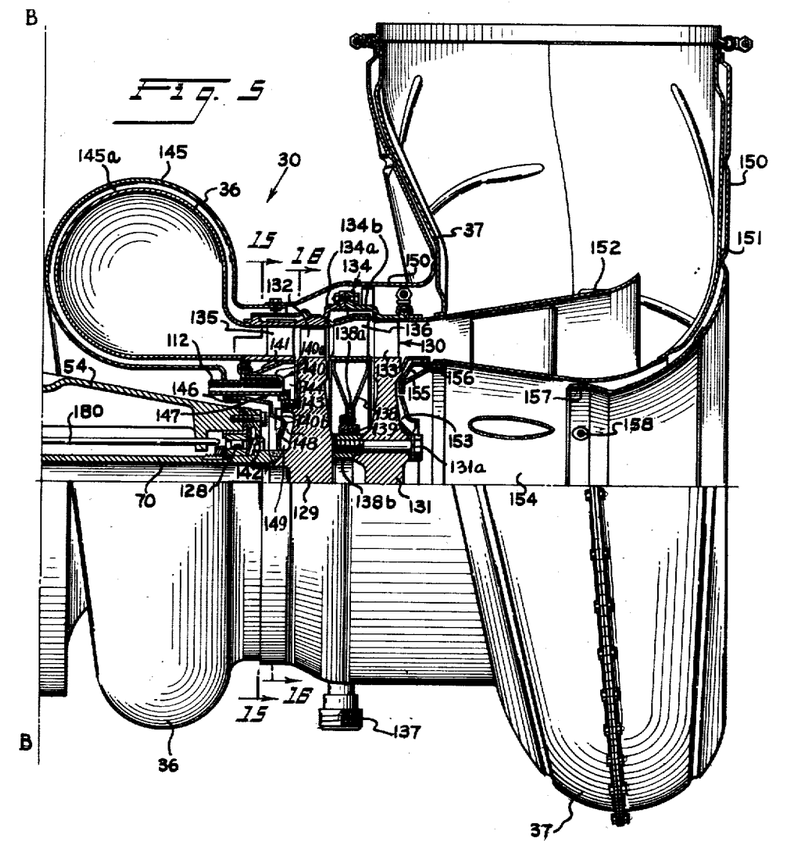

Referring now to Figures 1 to 5, and of which Figures 3 to 5 have been arranged as a set looking along the power plant in section, and with parts in elevation. The silencer casing 32, is formed of three abutting arcuate sections (Figure 2), namely, end sections 38 and 39, and an intermediate section 40. Each of these sections is formed of sheet metal structural elements defining radially spaced arcuate top and bottom walls, 41 and 42 (Figure 4), respectively, and longitudinally spaced opposed end walls 43 and 44.

Bulkheads 45 are inserted between the intermediate section 40 and the two end sections 38 and 39 (Figure 2), and extend between the adjacent ends of the end walls 43 and 44 of the respective sections to enter between flanges 46 of the silencer casing 32. The sections are bolted together as indicated at 47.

Figure 7:
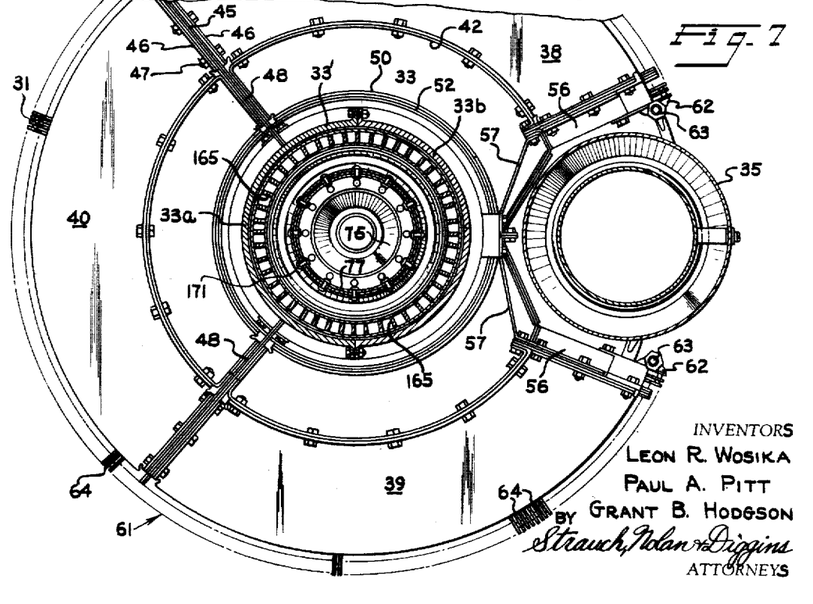
Figure 7 is a transverse sectional view of the assembly taken along the line 7—7 of Figure 4.

The bulkheads 45 extend in part through the lower wall 42 of the casing to provide supporting plates 48 (Figures 4 and 7), which are secured to the compressor casing 33, and so support the part of the silencer casing extending over the compressor casing in spaced relation to the compressor casing. The plates 48, are apertured, as indicated at 49 (Figure 4), for the circulation of air therethrough to avoid the possibility of pockets of dead air.

An extension 50 (Figures 4 and 7), of the lower wall 42, provides an inboard support for the casing 32, and forms part of the passage defining means for air passing from the casing 32 into an inlet scoop 51, in extending down to terminate in a lip 52, which rests in sealing engagement with a resilient gasket 53, on the compressor casing. The right end wall 44 of the casing 32 (Figure 4) extends down to and is suitably connected to an annular casting 54, to be described fully hereinafter, and the bulkheads 44, are cut away, as indicated at 55, for the passage of air radially to the scoop 51.

Closure members 56 (Figures 1 and 7), close the spaced radially opposed ends of the end sections 38 and 39 of the silencer casing 32 and supporting plates 57 extend down to the compressor casing 33, and are secured thereto. The plates 57, are of bright metal and also function as shields to deflect hot air circulating about the combustion chamber casing 35, away from the silencer casing 32.

Perforated aluminum sheets extend between the bulkheads 43, and between the bulkheads and the closure members 56, and carry suitable silencing material to define concentric silencers 58 (Figure 4), in the path of the axially directed air. Means are also provided within the casing 32, to define hollow metal pockets 59 of which are filled with insulating material to insulate the interior faces of the casing 32. The casing itself if formed of bright metal so that its heat reflecting properties retard heat flow from the outer atmosphere to the interior of the casing. Means are provided to define an opening or channel 60 in the top wall 41 of the casing 32 remote from the outlet end of the casing. Nested rows of oil-filled tubes 31 are disposed in the opening, the bottom row of tubes 31 are disposed in the opening, the bottom row of tubes sitting on top of the bulkheads 45 and the closure members 56. It will be noted that the tubes are arranged to define an inwardly converging air inlet 61 for the casing 32. The tubes 31, are connected in parallel at their ends to headers 62 (Figures 1, 4 and 7), which are provided with couplings 63 for connection to a lubricating system described hereinafter. The tubes 31 are integrally spiralled and are held apart but in close juxtaposition by spaced fins 64. Because of the manner in which the tubes are disposed to define the air inlet, the arrangement of tubes and fins provides air silencing means in that it defines a multiplicity of short but tortuous paths in parallel.

The cooling tubes 31 raise the temperature of the inlet air to the compressor to a slight degree and, while it would appear to be disadvantageous to raise the temperature of the air entering the compressor, the disadvantage is slight compared with the compensating advantages of a simple cooling structure and the absence of coolers and fans external to the integrated assembly which would add weight to the installation while increasing its complexity in operation and maintenance. External cooling auxiliaries also take up too much space in cramped quarters, and they also lower the ability of the installation to withstand shock incident to use on a ship or aircraft exposed to enemy action during war. It will be noted too, that the cooling means afforded by the tubes 31, are disposed at a point substantially remote from the combustion chamber 35. An elongated cylindrical casing (Figures 4 and 7) formed of two semi-cylindrical parts 33a and 33b, bolted together forms the stator casing 33' of the compressor 33, and carries stator vanes, to be described herein. Secured to the right hand of the casing 33' (Figure 4) is an annular machined casting 65 which connects the casing with a wall 66 of the turbine casting 54 as indicated at 67. The casting 65 also defines the intake scoop 51 of the compressor, this scoop being provided with circumferentially spaced internal partitions or guide vanes 68 extending axially of the compressor 33. A ball-bearing assembly 69 is mounted in the wall 66 to form a thrust bearing for a tubular turbine shaft 70 which is spline connected at 71 to a short stub shaft 72. The shaft 72 is similarly spline connected at 73 to a hub 74 of a dished casting 75, the hub being carried by a ball-bearing assembly 76 mounted in the casting 64. The dished casting 75 forms the driving connection between the shaft 72 and an elongated cylinder 77 which carries the compressor rotor vanes to be described.

The ball-bearing assembly 69 takes the thrust on the turbine shaft 70 and the ball-bearing assembly 76 takes the thrust of the compressor. The spline connections 71 and 72 insure that the short shaft 72 does not take any of the thrust of the connected elements while permitting longitudinal adjustment of the connected parts with changes of temperature.

The casting 65 forms a part of means defining a chamber 78 which is sealed off from the compressor by a detachable member 79 secured to the casting 65 and carrying means cooperating with means on the dished casting 75 to define labyrinth seal 80.

At the left end of the compressor 33 (Figure 3), the compressor 33 discharges compressed air at a temperature of well over 400 degrees Fahrenheit through stator outlet vanes 82, which are secured to vane carrying rings 83, into the outlet scroll casing 34 through a diffuser bell portion 85 of the scroll casing. The scroll casing 34 is bolted at its right end to the compressor casing 33' and at its left end it has an outstanding annual flange 86 which is bolted to an outstanding anular flange 87 on a gear box 88. The scroll casing is made up of two mating sections, namely, an outer part which carries an outer wall 89 and an inner part 90 which provides an inner wall 91, and defines a shaft chamber 84. A dished casting 92 is secured to the left end of the rotor cylinder 77 and has a hub 93 carried by a roller bearing 94, mounted in a wall member 95 which closes the right hand end of the shaft chamber 84 and is integral with the part 90 of the scroll casing 34. The hub 93 has a splined connection with a hollow shaft 96 which extends to the left into the gear box 88 and connects through gears 97 with a power take off 104 (Figure 1).

The annular flange 87 of the gear box 88 is provided with a plurality of apertures or bores 98 through which air is admitted into the shaft chamber such admitted air is directed by suitable sheet metal duct means to pass through bores 99 in the wall 95 to a fan 100 which comprises blades carried on an annular member 101 secured to the dished casting 92. The air is discharged from the fan through the ported wall member 95 to an air duct 102 defined by annular sheet metal means placed adjacent to and in spaced opposed relation to the shaft chamber face of the inner wall 91 of the scroll casing 34. The duct 102 opens to air at outlet ports 103 formed in the scroll casing. The circulating air effectively cools the roller bearing 94 in passing through the bores 99 in the bearing carrying wall 95 about the bearing 94, the bores having such a large effective area that just enough metal is left in the wall 95 to adequately carry the bearing load. In spite of the fact that the air entering the scroll casing 34 from compressor 33 has a temperature of around 500 degrees Fahrenheit, the cooling air about the bearing 94 maintains it at a reasonable working temperature to decrease wear and maintenance. The circulated air also scours the shaft chamber defining face of the scroll casing 34 so that the temperature of the air leaving the scroll casing to enter the combustion chamber 35 is materially lower than its initial temperature. The circulated air entering through the bores 98 of the gear box flange and into the space defined between the right face of the gear box and the opposed face of the scroll casing 34 is also effective in cooling the part of the gear box which forms an oil reservoir indicated at 159. Means carried by the wall 95 cooperate with opposed means on the dished casting 92, and on the annular member 101, to define labyrinth seals 105 and 106, respectively.

Figure 6:
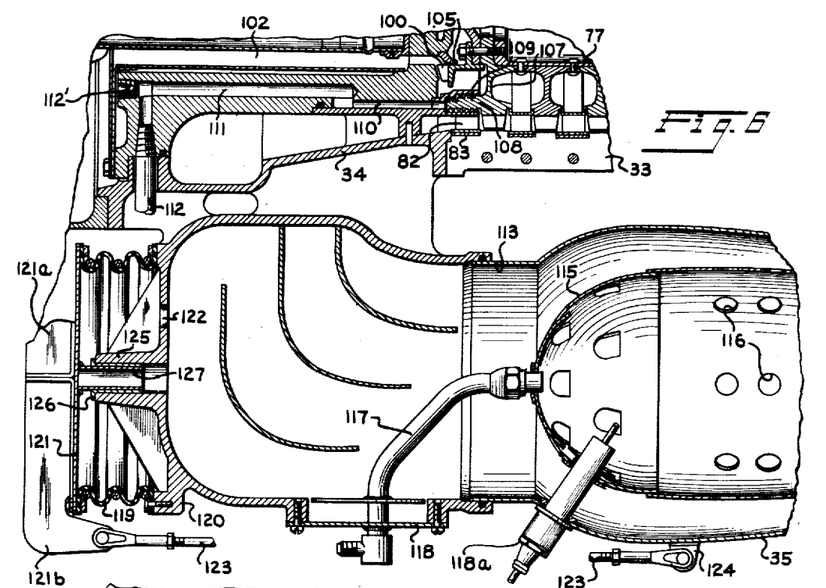
Figure 6 is a fragmentary sectional view of the compressor outlet scroll and the combustion chamber taken substantially along the line 6—6 of Figures 3 and 4.

On the left end of the rotor cylinder 77 (Figures 4 and 6), there is secured a vane carrying member 107 of the last rotor stage of the compressor. On the left side of the member 107 there is an integrally formed stepped annular flange 108 which is ridged to define, with the opposed wall of a bore 110, a labyrinth seal 109 formed in the wall of the scroll casing 34. A duct 111, formed in the inner wall of the scroll casing, communicates with the bore 110, and carries compressed air leaking through the seal 109, to an outlet pipe 112 which extends forward to the gas turbine. A metering plug 112' in the duct 111, may be adjusted to determine air flow to the pipe 112. The seal 109, and the purpose to which the leaking air is put is more fully described and claimed per se in a copending application Serial No. 66,534, filed December 21, 1948 by Leon R. Wosika for Gas Turbine and Cooling Structure, now Patent No. 2,722,101, issued November 1, 1955.

The combustion chamber casing 35 is connected at its inlet end to the compressor outlet scroll casing 34 by a slip joint 113 which is sealed by a conventional O ring and at its outlet end to the gas turbine inlet scroll 36 (Figure 4), by an adapter ring 114, which is removably secured to the turbine inlet scroll 36 and to the combustion chamber casing 35 by clamps 114a so that the combustion chamber casing may be easily removed for inspection or repairs. Within the combustion chamber casing 35 there is mounted a flame tube 115 (Figure 6) provided with side ports 116. The dome of the flame tube 115 is connected with a fuel supply pipe 117, which enters the outlet scroll casing 34, through a removable cover plate 118 to which it is welded. Spark-plug igniting means 118a also enter the dome of the flame tube.

To overcome undesirable thrust forces of the expanding air in the combustion chamber casing 35 and so meet the cantilever force exerted on the combustion chamber and its connected supports at the compressor outlet scroll casing 34 and at the turbine inlet scroll casing 36, compensating means have been provided which have been arranged so as not to impede the smooth flow of air through the power plant. The compensating means comprise an expandible metallic bellows means 119 secured between an annular flange 120 on the outlet scroll 34 and to a closure plate 121. The bellows communicates with the air space of the outlet scroll 34 through a port 122. The closure plate carries a pair of arms 121a and 121b to each of which a longitudinally adjustable rod 123 is hingedly connected, the rods extending forward to an anchoring connection 124 on the combustion chamber casing 35. To ensure against canting of the closure plate 121 and of the connected combustion chamber 35 and to provide pressure means in communication with the air in the scroll, the scroll casing 34 is provided with a ported boss 125 which carries a bearing sleeve 126, to slidably receive a tube 127 which is rigidly connected to the closure plate 121.

A similar compensating means is described more fully and claimed in copending application, Serial No. 44,537 filed August 16, 1948 by Leon R. Wosika for Thrust Balance Structure for Rotary Gas Engines and issued August 5, 1952 as United States Letters Patent No. 2,605,611.

Referring now to Figures 4 and 5, the annular casting 54, extends forward from its rear wall 66 which carries the thrust bearing 69 of the turbine shaft 70 toward the turbine, the right hand end of the casting 54 carrying a roller bearing 128 for the turbine shaft 70.

The turbine shaft 70 is welded to rotor wheel 129 of the first stage of a turbine 130 and second wheel 131 of the second stage of the turbine is bolted by bolts 131a to the first wheel. The first rotor wheel 129 carries vanes 132 and the second wheel 131 carries vanes 133. A turbine stator casing 134 is formed of two parts 134a and 134b bolted together and carries inlet vanes 135 of the first stage and intermediate directing vanes 136 between the first and second stages of the turbine. Compressed air may be admitted through a coupling 137 and through the intermediate vanes 136 for starting purposes, the air being suitably directed against the second stage rotor vanes 133. Partition means 138 project inwardly from the stator 134 into the space between the first and second stage rotor wheels and carry a ridged member 138a cooperating with an annular flange 138b on the forward face of the first wheel 129 to define a labyrinth seal 139.

The structure of the rotor wheels and the structure of the stator are described more fully in the copending application Serial No. 227,806 of Leon R. Wosika filed May 23, 1951 and issued on June 22, 1954 as United States Patent No. 2,681,788.

A sub-assembly casting 140, which comprises an outer annular wall 140a connected to an inner annular wall 140b by radial ribs, is secured to the casting 54, and is secured to the stator casing 134, by an annular member 141, of sheet metal. The inner annular wall 140b of the casting 140 cooperates with an annular member on the turbine shaft 70 to define a labyrinth seal 142 and the outer annular wall of the casting 140 carries an attached member cooperating with an annular flange on the rear face of the first wheel 129 to define a labyrinth seal 143.

The sheet metal member 141 defines with the casting 140 and the rear face of the rotor wheel 129 a chamber 144 which is normally in communication with the hot gas in the turbine through the working clearance between the rotor and stator vanes of the first stage. Air is admitted to the chamber 144 through the pipe 112 and its metering plug 112' (Figure 6), hereinbefore referred to as communicating with the labyrinth seal 109.

The air opposes the admission of hot gas into the chamber 144 while at the same time tending to keep down the working temperature of the rotor wheel 129 but is so controlled that no air of substantial volume can enter the main gas stream of the first stage of the turbine and so that there is no interference with the normal smooth flow of the hot gas through the first stage of the gas turbine.

The pipe 112 is preferably connected to the hot end of the compressor 33 through the labyrinth seal 109 and through the metering plug 112', and the air passing therethrough controlled in quantity so that the temperature of the air leaving the pipe 112 and entering the chamber 144 is such that the temperature difference between the air entering the chamber and that of the tip of the wheel 129 is such as to ensure adequate transfer of heat from the tip of the wheel to the air in the chamber to keep the tip at a reasonable working temperature but without setting up thermal stress in the tip.

The admission of air into the chamber 144 for the purposes described above is more fully dealt with per se in a copending application Serial No. 66,534 filed December 21, 1948 by Leon R. Wosika for Gas Turbine Sealing and Cooling Structure, now Patent No. 2,722,101, issued November 1, 1955.

The turbine gas inlet scroll 36, which connects the combustion chamber casing 35 with the turbine stator inlet vanes 135 of the gas turbine 130, is housed within an enveloping sheet metal casing 145 so that an air duct 145a is formed between the inlet scroll and the enveloping casing. A portion of the wall of the casing 145, is deflected, as indicated at 146, and is slotted to fit about the radial ribs in the sub-assembly casting 140, so that an air chamber 147 is formed between the deflected portion and the left face of the first turbine rotor wheel 129. A fan 148 is mounted on the wheel 129 to draw air through an opening 149 in the deflected portion of the casing 145 and to expel the air into the chamber 147 and the air duct 145a formed between the inlet scroll casing 36 and the enveloping casing 145. The air entering the fan 148 is drawn along a passage defined between the outer face of the annular casting 54 and the opposed portion of the enveloping casing 145 and thus scours the face of the casting 54 to aid in keeping the casting and the roller bearing 128 at a reasonable working temperature. It also tends to cool the first stage turbine rotor wheel 129 and to build up an opposing pressure about the labyrinth seal 143 while also tending to cool hot oil from the bearing 128 as it drops into a dry sump formed by the casting 54 to flow out through a sump outlet pipe 179.

The enveloping casing 145 is carried forward beyond the gas inlet end of the turbine 130 as an enveloping casing 150 which is disposed about the turbine stator casing 134 and goes forward in spaced enveloping relation about the turbine exhaust scroll 37.

Resilient spacing and connecting members 151 are disposed in the air duct space between the exhaust scroll 37 and the enveloping casing 150.

The gas leaves the second stage of the turbine 130 to exhaust into a horn or bell 152, which opens into the exhaust scroll 37. A high pressure blower 153 is mounted on the face of the second stage wheel 131 to draw air from atmosphere through an annular member 154 which connects the bell 152, and the exhaust scroll casing 37 in supporting relation. The blower 153 discharges air into a passage defined by sheet metal plate members 155 secured to the bell 152. The sheet metal members 155 are arranged to define an elongated ejector jet defining means 156 so that the air from the blower 153 is ejected along the inner face of the bell 152 to prevent eddying and stratification of the hot gas exhausted from the turbine. The air jet also aspirates the hot gas from the turbine and prevents gas from escaping radially through the working clearance between the second stage wheel and the stator connection to the bell.

The blower 153 and its associated means for ejecting air into the bell 152 are described more in detail in a copending application, Serial No. 66,532 filed December 21, 1948 by Leon R. Wosika for Exhaust Structure for Gas Turbine, now Patent 2,713,990 issued September 26, 1955, insofar as the aspirating features are concerned.

The air duct defined between the enveloping casing 150 and the exhaust scroll 37 has a terminating opening indicated at 157 where the enveloping casing is held in spaced relation to the exhaust scroll 37, by peripherally spaced connectors 158 so that air is drawn from the air duct by the blower 153 to enter the main stream of air entering the blower and to be ejected into the bell 152 with the gas exhausting from the turbine. Suitable means, not shown, carry the exhaust from the turbine exhaust scroll 37 to above decks when the power plant is installed below decks on a ship.

It will now be evident that the outer faces of the enveloping casings 145 and 150 present surfaces at a temperature materially lower than that of the confined gas inlet scroll 36, the gas turbine casing 134, and the exhaust scroll 37. This is of major importance when the power plant is installed in cramped quarters below decks on a ship or in equally cramped quaters on an aircraft in contributing to the comfort of the operating staff and also in contributing to the safety of the members of the staff should they be thrown against the enveloping casings during rough weather at sea or in the air. The air pressure in the ducts between the enveloping casings and what they confine also prevents the escape of dangerous gas into the space in which the power plant is installed should leaks develop in the confined parts. The air circulated through the duct space defined between the casings 145 and 150 and what they confine is also carried into the exhaust outlet scroll 37 by the action of the blower 153 and the ejector means 156 so that should leaks of dangerous gas occur this gas will be ejected into the outlet scroll 37 to be exhausted at a safe distance from the operating staff.

The compressor stator

Figures 8, 9, 10, 11, 12, 13:
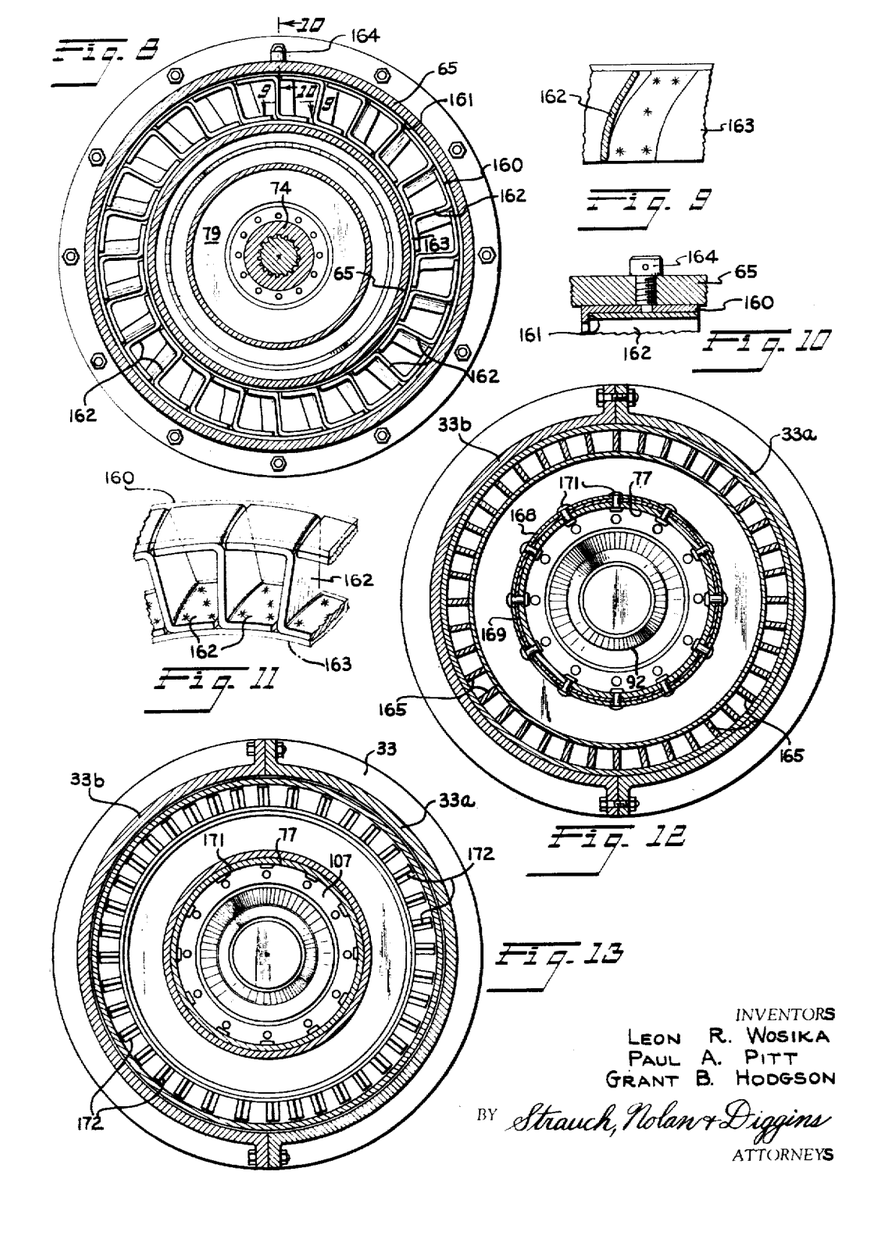
Figure 8 is a fragmentary transverse sectional view of the air inlet guide structure for the compressor taken substantially along the line 8—8 of Figure 4.
Figure 9 is a sectional view taken along the line 9—9 of Figure 8 illustrating the cross-sectional configuration of the guide vanes of the compressor inducer assembly.
Figure 10 is a fragmentary sectional view taken along the line 10—10 of Figure 8 illustrating the mounting of the compressor inducer assembly within casting forming the compressor inlet throat.
Figure 11 is a fragmentary perspective view of the compressor inducer assembly of Figure 8.
Figure 12 is a transverse sectional view taken along the line 12—12 of Figure 4 illustrating the structural arrangement of a compressor stator section.
Figure 13 is a transverse sectional view taken along the line 13—13 of Figure 4 illustrating the structural arrangement of a compressor rotor section.
Figure 11:
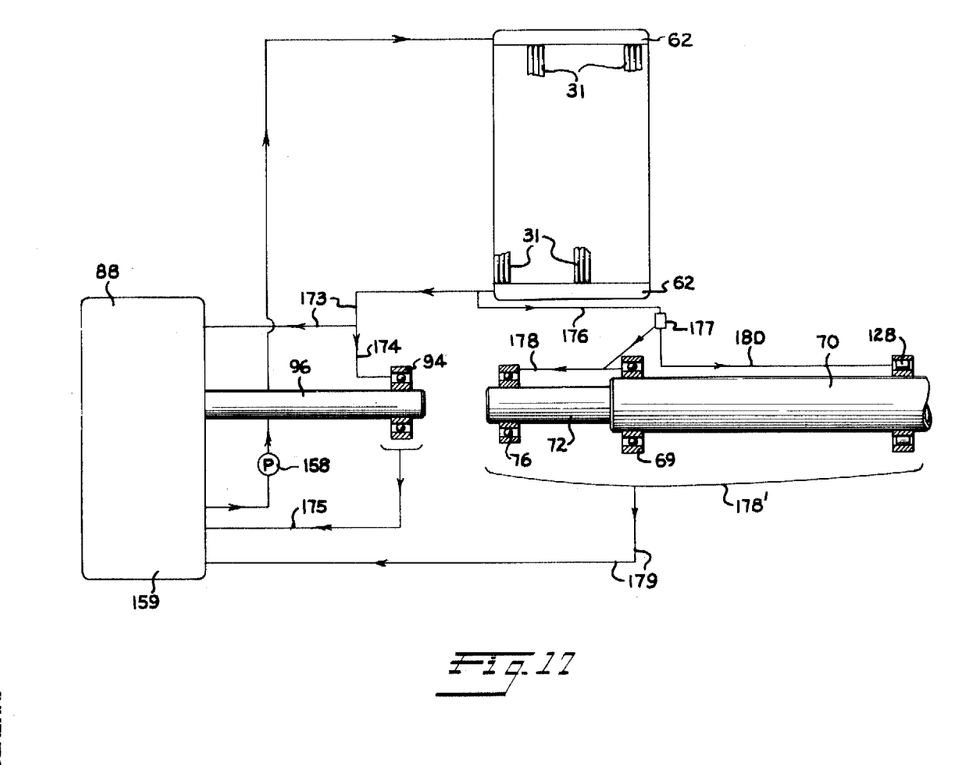
Figure 14:
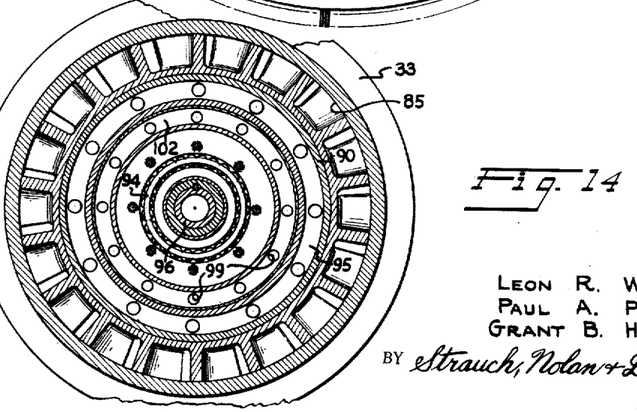
Figure 14 is a transverse sectional view taken along the line 14—14 of Figure 3 illustrating the air guide structure at the outlet end of the compressor.
Figure 15:
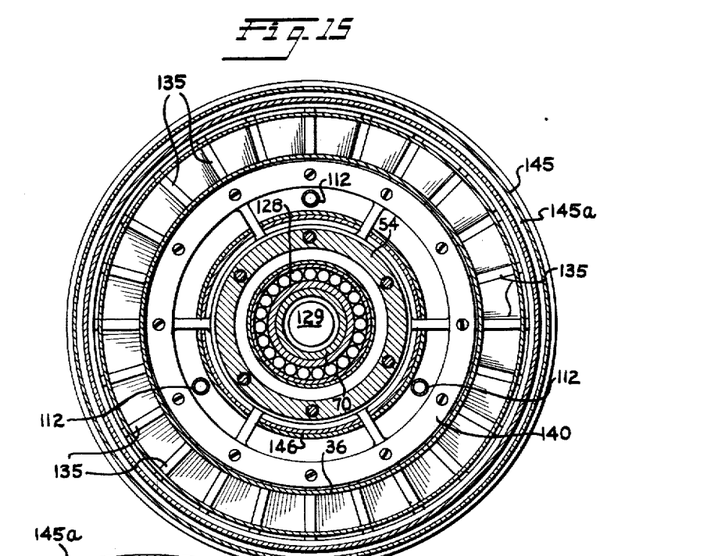
Figure 15 is a transverse sectional view taken along the line 15—15 of Figure 5 illustrating inlet stator vane structure for the first stage of the gas turbine.
Figure 16:
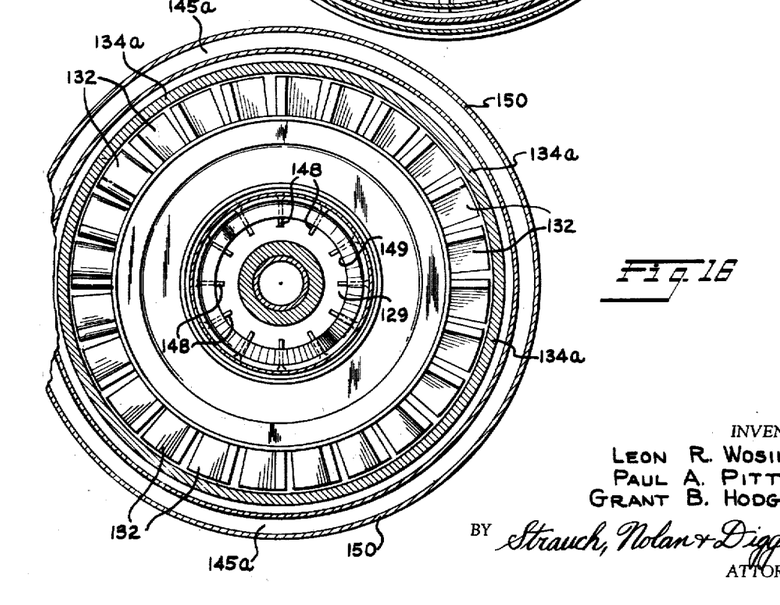
Figure 16 is a transverse sectional view taken along the line 16—16 of Figure 5 illustrating the first rotor stage of the gas turbine.

Referring now to Figures 4, 8, 9, 10 and 11 at the inlet end of the compressor and mounted in the annular casting 65 where it defines the throat of the intake scoop 51 is a compressor inducer assembly which includes an outer sheet metal ring 160, nested in a recess 161, in the casting 65 so that its inner peripheral surface is flush with the inner peripheral surface of the adjacent surfaces defining the throat. Attached to the ring 160 by spot welding are a plurality of inducer blades 162, of sheet metal, and shaped to control and direct the inrushing mass of air from the mouth of the intake scoop. The blades 162 terminate at their inner peripheral area to abut a shouldered inner ring 163, the shoulder of the receiving ring having a depth not greater than the thickness of the blade. As seen in Figures 8 and 11 the ends of the blades 162 abut in tight fit, one with the other, at their axial terminals upon assembly with the outer ring 160 and the inner ring 163. The assembly is held in position by screws 164 (Figure 10) passing through the wall of the throat of the scoop 65 and engaging the outer sheet metal ring 160.

The air mass at the entrance to the inducer assembly has a velocity of approximately 528 feet per second and, without the control exercised by the inducer assembly the air would have a tendency toward premature compression and stagnation which would result in an unacceptable condition of intermittent burst of compression instead of the desired full and steady flow made possible by the inducer assembly.

The inducer assembly is of novel design in that it employs sheet metal construction instead of the conventional cast vanes or blades and rings machined from rolled bar stock, castings or forgings. The light and inexpensive inducer assembly is made possible by the novel construction and arrangement of the blades abutting tight fit with each other at their axial terminations on the rings 160 and 163.

Stator vanes 165, on the compressor casing 33, are of conventional construction.

The compressor rotor

A first stage rotor disc 166 (Figure 4) is mounted on the right hand end of the rotor cylinder 77 and has a ridged portion cooperating with an opposed portion of the annular casting 65 to define a labyrinth seal 167. The disc 166 has a rearwardly extending annular web 168, which is recessed at its rear end to fit over the forward end of a forwardly extending annular web 169 of the second stage rotor disc 170. Where the interfitting ends of the webs 168 and 169 meet, they are both secured to the rotor cylinder 77 by rivets 171. The second stage rotor disc 170 is also provided with a forwardly extending annular web and the rotor discs of the remaining stages of the compressor are connected to the rotor cylinder 77 by rivets through their mating annular webs in the manner just described in connection with the first and second stage rotor discs.

Each of the rotor discs carries rows of vanes 172 of conventional shape and area appropriate to the duty of the rotor disc stage in which they are placed. The rotor cylinder 77 may be of thin wall section for the driving load is carried for the greater part by the rivet connected rotor discs, with the cylinder a convenient means for assembling them in aligned relation and for maintaining them in aligned relation.

The lower portion of the gear box 88 forms an oil reservoir, indicated by the numeral 159 in Figure 3. As best shown in the lubricating system line diagram of Figure 17, which supplements parts of the showings in Figures 3, 4 and 5, an oil pump 158 within the gear box 88 draws oil from the reservoir 159 to force it through the oil-cooling tubes 31 on the silencer casing 32. From the tubes 31 it is led by a pipe 173, to the gears 97 of the gear box 88 at lubrication points, not shown, to fall into the reservoir. A branch pipe 174 delivers the cooled oil to the roller bearing 94 carried by the wall 95 of the outlet scroll casing 34 and this oil returns to the reservoir by a pipe 175 within the shaft chamber 84 of the outlet scroll casing (Figure 3). It has already been noted that the right face of the gear box 88 is cooled by air passing through the space between this face and the opposed face of the outlet scroll casing. Another branch pipe 176 carries the cool oil to a common inlet 177 (see also Figure 4) in the turbine casting 54 and from the common inlet a pipe 178 carries the cool oil to the thrust bearings 69 and 76. The hot oil from these bearings passes through a port near the bottom of the end wall 66 of the turbine casting to enter a dry sump 178' which has an outlet connection with a pipe 179 to return the oil to the reservoir. Another pipe 180 extends from the common inlet 177 to the roller bearing 128 (Figure 5) in the turbine casting 54 and the hot oil drops into the dry sump 178' for return via the pipe 179.

The cool oil, under pressure, not only lubricates the several bearings to which it is applied, but it also performs the important function of cooling the bearings to reduce maintenance of the bearings in hot zones of the power plant.

It will now be apparent that the invention described herein results in a gas turbine power plant well adapted to meet the unusually exacting space and weight requirements of auxiliary power plants for use on aircraft or for use below decks on a ship.

Because a compact gas turbine power plant has small areas of heat radiating surfaces it has been usual to expect destructively high temperatures in the hot zones of the plant, short life of bearings, and uneconomically high clearances between rotor and stator vanes. In the invention just described the temperature of the working parts in the hot zones are maintained reasonable for long life and low maintenance and the clearances are also reasonable to promote high thermal efficiency. External cooling equipment which would add to the complexity of the plant has been made unnecessary, and the prior practice of injecting cooling air into the gas inlet stream of the turbine has also been made unnecessary.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gas turbine power plant comprising an axial flow compressor having means defining a side entry at one end and having an outlet scroll casing at the other end, a gas turbine adjacent said one end and connected to said compressor in axial alignment therewith, said turbine having an inlet scroll casing, an elongated inlet silencer casing disposed partially enveloping said compressor and supported on said compressor in spaced relation thereto, said silencer casing having means defining an air outlet at one end connected to said side entry and having means defining an air inlet at its other end and remote from said outlet end, a longtitudinally extending combustion chamber casing disposed parallel with said compressor and at one side thereof, said combustion chamber being supported at one end by said inlet scroll and being supported at its other end by said outlet scroll, said combustion chamber being disposed between spaced opposed peripherally directed ends of said silencer casing and in spaced opposed relation to said ends.

2. The gas turbine power plant defined in claim 1, together with heat reflecting shield plates on the peripherally directed ends of said silencer casing, and disposed about a portion of said combustion chamber in spaced opposed relation thereto to reflect heat from said combustion chamber casing away from said silencer casing.

3. A gas turbine power plant comprising an axial flow compressor having means defining a side inlet entry at one end having an outlet scroll casing at its other end, a gas turbine in axial alignment with said compressor and having an inlet scroll casing, shaft means connecting said gas turbine with said compressor, shaft bearing means, an air silencer casing disposed partially enveloping said compressor and supported on said compressor, said silencer casing having means defining an air inlet at one end, and having means defining an air outlet at its other end in connection with said side entry, oil cooling tube means disposed in said air inlet of said silencer casing and connected with conduit means to deliver cool oil to said shaft bearing means to cool and lubricate said shaft bearing means, a combustion chamber casing extending parallel with said compressor and at one side thereof, and in fluid communication with said outlet scroll casing and with said inlet scroll casing.

4. A gas turbine power plant comprising an axial flow compressor having means defining a side inlet entry at one end having an outlet scroll casing at its other end, a gas turbine in axial alignment with said compressor and having an inlet scroll casing, an air silencer casing disposed partially enveloping said compressor and supported on said compressor in spaced relation thereto, means defining an air outlet for said casing in alignment with and in connection with said side inlet entry of said compressor, means defining an air inlet for said silencer casing at its opposite end, a longitudinally extending combustion chamber casing supported at one end by said compressor outlet scroll and supported at its other end by said turbine inlet scroll, and extending parallel with said compressor and at one side thereof, said silencer casing, said compressor and said combustion chamber defining conduit means whereby air is directed for flow in one axial direction through said silencer casing, then directed for axial flow in an opposite direction in said compressor, and again reversed in said outlet scroll for axial flow in its initial direction through said combustion chamber casing.

5. A gas turbine power plant comprising an axial flow compressor having means defining an inlet entry at one end and having means defining at outlet scroll at its other end, a gas turbine connected to the one end of said compressor and in axial alignment with said compressor, said turbine having a gas inlet scroll and also having an exhaust scroll, a combustion chamber casing connected at one end to said gas inlet scroll and connected at its other end to said compressor outlet scroll, an enveloping shield means disposed about said turbine, and about said gas inlet scroll, and about said exhaust scroll to define an air duct about the enveloped turbine, about the enveloped gas inlet scroll, and about the enveloped exhaust scroll, and means in fluid communication with the ambient air outside of said enveloping casing to force air through said air duct.

6. The combination defined in claim 5, together with a wheel rotatable in said turbine, and fan means on said wheel and within said envelopng casing to force air through said duct.

7. A gas turbine power plant comprising a compressor, and a combustion chamber, and a gas turbine in series fluid connection, said gas turbine including a stator casing having a gas inlet scroll connected to one end of said stator casing and having an exhaust scroll connected to the other end of said stator casing, a first wheel rotatable in said turbine, a second wheel rotatable in said turbine, an enveloping shield means disposed about said turbine stator casing and about said gas inlet scroll and about said exhaust scroll to define an air duct about the enveloped stator casing, and the gas inlet scroll and the exhaust scroll, a first fan on said first wheel and in fluid communication with the ambient air outside said enveloping casing and arranged to blow air through said duct, and a second fan on said second wheel and in fluid communication with the gas discharged by said turbine into said exhaust scroll from said stator casing and also in fluid communication with said air duct and arranged to aspirate air from said duct and expel it into said exhaust scroll with the gas discharged from said stator casing.

8. A gas turbine power plant comprising a compressor, and a combustion chamber, and a gas turbine in series fluid connection, said gas turbine including a stator casing having a gas inlet scroll connected to one end of said stator casing and having an exhaust scroll connected to the other end of said stator casing, an enveloping shield means disposed about said stator casing and about said gas inlet scroll and about said exhaust scroll to define an air duct about the enveloped stator casing, and the gas inlet scroll, and about the exhaust scroll, means to force cool air through said duct, and means to exhaust air from said duct and direct it into the interior of said exhaust scroll.

9. In a gas turbine power plant including an axial flow compressor, a combustion chamber, and a gas turbine connected in a series fluid communication; means defining an annular air intake for the inlet end of said compressor and an annular inducer assembly disposed in said intake and comprising concentric outer and inner sheet metal rings and a plurality of equiangularly spaced sheet metal inducer blade forming members extending between said rings and welded to each.

10. The combination defined in claim 9, wherein each of said blade forming members consists of an inner and an outer flange interconnected by an integral blade.

11. The combination defined in claim 10, wherein the end of each flange of each blade forming member abuts against the end of the blade portion of the next adjacent blade forming member.

12. The combination defined in claim 11, wherein said blade forming members are of generally Z-shaped configuration in cross-section.

13. A gas turbine power plant comprising a compressor, a combustion chamber, and a gas turbine in series fluid connection, said compressor including a stator and a rotor, a gear box, gears in said gear box, an outlet scroll casing for said compressor and connected for support at one end to said stator and at the other end to said gear box, a portion of said scroll casing defining a shaft chamber having a ported wall at one end thereof, a bearing mounted in said wall, a supporting member for the outlet end of said rotor connected to said rotor and journalled in said bearing, a shaft in said shaft chamber in driven connection at one end with said supporting member and in driving connection at its other end with said gears, and means to circulate atmospheric air through said ported wall, and about said bearing to cool said bearing, and also to cool the portion of said scroll casing defining said shaft chamber.

14. The combination defined in claim 13, and with the means to circulate the air through said ported wall and about said bearing, including a fan mounted on the output end of said rotor and in fluid communication with the air in said shaft chamber, and means defining an air duct in communication with atmosphere at one end and in communication with said shaft chamber at its other end.

15. A gas turbine power plant comprising a compressor, a combustion chamber, and a gas turbine in series fluid connection, said compressor including a stator and a rotor, a gear box, gears in said gear box, a portion of said gear box defining a reservoir for oil, a ported annular flange on said gear box, an outlet scroll casing for said compressor and having a first annular flange connected to said stator, a second annular flange on said scroll casing connected to the ported annular flange of said gear box, said second annular flange having a plurality of ports for the passing of air therethrough, a portion of said outlet scroll casing being arranged to define an elongated shaft chamber having a ported wall at one end thereof, a bearing mounted in said wall, a supporting member for the outlet end of said rotor connected to said rotor and journalled in said bearing, a shaft in said shaft chamber in driven connection at one end with said supporting member and in driving connection at its other end with said gears, a fan on the output end of said rotor, a first duct means in said shaft chamber in fluid communication with the ports in said annular flange of said gear box and with said fan, through said ported wall, so that the fan may draw air from atmosphere along a face of said gear box to cool the portion thereof defining the reservoir, and a second duct means in fluid communication with said first duct means through said ported wall so that said fan may expel the air drawn through said first duct means into said second duct means to cool said scroll outlet casing and to exhaust to atmosphere through said ports in said second annular flange.

16. A gas turbine power plant comprising a compressor, a combustion chamber, and a gas turbine in series fluid connection, said gas turbine including a stator casing and a wheel revolvable within said casing, annular casting means connected to said compressor at its inlet end and extending towards said turbine in coaxial aligned relation with said compressor, a resilient annular member connecting said casting means with said turbine stator, an annular flange on said wheel, ridged means on said casting cooperating with said annular flange to define a labyrinth seal, and seal a chamber defined by said casting means and said wheel, and in fluid communication with said stator through the working clearance between said wheel and said stator, a pipe entering said chamber through said casing means, fluid controlling means connecting said pipe with said compressor, and fan means on said wheel and in fluid connection with atmosphere and arranged to blow air at atmospheric temperature about said seal defining means.

17. The combination defined in claim 16, and with said pipe entering said chamber through said casing means being connected through fluid controlling means to the outlet and hottest end of said compressor to determine the temperature difference between the air entering said chamber and that of the portion of said wheel adjacent said stator.

18. A gas turbine power plant comprising a compressor, a combustion chamber, and a gas turbine in series fluid connection, said compressor including a stator and a rotor, an outlet scroll casing for said compressor connected to said stator, a portion of said scroll casing being arranged defining an elongated chamber having a ported wall at one end and open to atmosphere at its other end, a bearing mounted in said wall, a supporting member for said rotor connected to said rotor and journalled in said bearing, and a fan mounted on the compressor outlet end of said rotor and disposed between said bearing and the compressor outlet end of said rotor, and arranged to circulate atmospheric air through said ported wall and about said bearing to cool said bearing, and to also circulate atmospheric air in said elongated chamber to cool said outlet scroll casing.

19. A gas turbine power plant comprising a compressor having an air inlet means at one end and having an outlet scroll casing at its other end, a gas turbine having a gas inlet scroll at one end and an exhaust scroll at the other end, and a combustion chamber connected at one end to said outlet scroll and connected at its other end to said gas inlet scroll, said compressor including a stator and a rotor, said gas turbine including a stator and a wheel revolvable within said stator, a first annular casting defining an elongated chamber and connected to said turbine stator at one end, a roller bearing supported by said first casting at the one end of said casting, a first ball-bearing assembly defining a thrust bearing supported by said first casting at the other end of said first casting, a second annular casting defining an elongated chamber and having one end connected to said stator of said compressor at said one end of said compressor, a second ball-bearing assembly defining a thrust bearing supported by the one end of said second annular casting, the other end of said second annular casting being connected to the other end of said first annular casting, a first shaft in said first annular casting, said first shaft being tubular, a second shaft in said second annular casting, said first shaft being connected at one end to said wheel and being supported for rotation by said roller bearing disposed adjacent the one end of said first shaft, a dished casting connected to said compressor rotor at the one end of said compressor, said dished casting having a hub supported for rotation by said second ball-bearing assembly and having a splined connection with one end of said second shaft, the other end of said first shaft being supported for rotation by said first ball-bearing assembly and making a splined connection with the other end of said second shaft, said first annular casting having means defining an oil sump having an outlet for oil, a source of oil, oil-cooling means connected to said source and interposed in the path of air entering said air inlet means of said compressor, conduit means carrying oil from said oil-cooling means to said roller bearing and to said first ball-bearing and to said second ball-bearing to cool and lubricate said bearings, said second annular casting communicating with sump through a common passage for oil defined in said first and said second annular castings whereby hot oil from the aforesaid bearings enters said sump.

20. A gas turbine power plant comprising a compressor having an air inlet at one end and having an outlet scroll casing at its other, a gas turbine having a gas inlet scroll at one end and having an exhaust scroll at its other end, and a combustion chamber connected at one end to said outlet scroll and connected at its other end to said gas inlet scroll, said compressor including a stator and a rotor, said gas turbine including a stator and a wheel revolvable within said stator, a first annular casting stator at one end, a second annular casting connected at one end to said compressor stator at the one end of said compressor, said second annular casting being connected at its other end to the other end of said first annular casting whereby said gas turbine is connected to said compressor in axial alignment with said compressor, shaft means extending within said first and said second annular castings and connecting said wheel of said gas turbine with said rotor of said compressor, bearing means on said first annular casting and bearing means on said second annular casting arranged supporting said shaft means for rotation, a fan on said wheel and duct defining means, including the outer face of said first annular casting, in fluid communication with atmosphere and with said fan to pass cooling air about said casting.

21. A gas turbine power plant comprising a compressor having an air inlet at one end and having an outlet scroll casing at its other end, a gas turbine having a gas inlet scroll at one end and having an exhaust scroll at its other end, and a combustion chamber connected at one end to said outlet scroll and connected at its other end to said gas inlet scroll, said compressor including a stator and a rotor, said gas turbine including a stator and a wheel, a first annular casting connected to said turbine stator at one end, a roller bearing supported by said first annular casting at its one end, a second annular casting connected at one end to the one end of said compressor, said second annular casting being connected at its other end to the other end of said first annular casting whereby said gas turbine is connected to said compressor in axial alignment with said compressor, shaft means extending within said first and said second annular castings and connecting said wheel of said gas turbine with said rotor of said compressor, bearing means on said second annular casting and bearing means on said first annular casting and including said roller bearing arranged supporting said shaft means for rotation, said one end of said first annular casting and said roller bearing being disposed in a hot zone adjacent the inlet end of said gas turbine, means to cool the one end of said first annular casting and to cool said roller bearing, said cooling means comprising a source of oil, oil-cooling means interposed in the path of air entering said air inlet of said compressor and connected with said source, conduit means carrying oil from said oil-cooling means and discharging cool oil on said roller bearing, and a fan on said wheel and in fluid communication with the air of the atmosphere, and arranged to draw cooling air about the outer face of said first annular casting adjacent its one end.

22. A gas turbine power plant comprising an axial flow compressor having means defining a slide inlet entry at one end and having an outlet scroll casing at the other end, a gas turbine connected to said compressor at the one end of said compressor and in axial alignment therewith, said turbine having an inlet scroll casing, an elongated combustion chamber connected at one end to said outlet scroll casing and connected at its other end to said inlet scroll casing, and extending in parallel relation to said compressor and at one side thereof, an elongated silencer casing disposed partially enveloping said compressor, said casing comprising arcuate sheet metal sections defining radially spaced top and bottom walls and axially spaced side walls, bulkhead means in said casing and connecting the end walls, said bulkhead means arranged extending through the bottom wall of said casing and secured to said compressor to suport said casing in spaced relation on said compressor, means within said casing and carried by said bulkheads to define air silencer means in the path of air flowing through said casing, means at one end of said casing defining an air outlet in connection with said side inlet entry, means at the other end of said casing defining an air inlet, a bank of tubes in parallel disposed in said air inlet and supported by said bulkheads, said casing having peripherally directed and spaced opposed ends, closure means on said opposed ends, said combustion chamber being disposed between said opposed ends of said casing and in spaced relation to said ends.

23. A gas turbine power plant comprising an axial flow compressor having a centrally disposed rotor; an axially spaced, coaxially arranged, axial flow turbine disposed adjacent the entry end of said compressor with its entry end facing said entry end of said compressor and having a centrally disposed rotor cantilever supported and journalled at the entry end of said turbine; a shaft interconnecting the entry end of said compressor rotor and the entry end of said turbine rotor and adapting said compressor to be driven by said turbine; a side outlet compressor scroll disposed at the outlet end of said compressor in coaxial relation to said compressor and turbine and having a central opening therethrough; a main power shaft connected at one end to the outlet end of said compressor rotor and extending through said central opening in said compressor outlet scroll; a side inlet turbine scroll disposed between the inlet end of said compressor and the inlet end of said turbine in radially spaced surrounding relation to said first mentioned shaft, said turbine scroll being fixed to said compressor and supporting the stator portion of said turbine; at least one generally longitudinally extending combustion chamber disposed in laterally offset relation to the axes of said compressor and said turbine and connected at its respective opposite ends to said side outlet of said compressor and said side inlet of said turbine; and a turbine exhaust duct having its inlet end disposed in coaxial relation to said turbine and adapted to direct the exhaust gases away from said turbine in a predetermined direction.

24. The gas turbine power plant defined in claim 23 wherein said combustion chamber includes means thereon for absorbing the axial thrust forces of combustion products therein to prevent transmission of such forces to either said compressor outlet scroll or said turbine inlet scroll.

25. The turbine power plant defined in claim 23 together with a combined inlet air silencer and lubricating oil cooler of generally annular configuration disposed in radially spaced, surrounding relation with respect to the entry end of said compressor and extending longitudinally toward the compressor outlet end to a substantially annular, axially and radially outwardly facing air inlet opening located at a point ahead of the combustion area of said combustion chamber so as to take in comparatively low temperature ambient air.

26. The combination defined in claim 25 wherein said radially outwardly facing portion of said air inlet is encircled by lubricating oil pipe coils disposed in side-by-side spaced relation whereby air entering said radially outwardly facing portion of said air inlet around said coils is effective to cool the oil circulating in said coils.

27. The combination defined in claim 25 wherein said generally annular air silencer and lubricating oil cooler terminates at angularly spaced points at opposite sides of a plane containing respectively the axes of said compressor and turbine and the axis of said combustion chamber thereby providing an inwardly directed recess for nestingly receiving the combustion area and outlet end portion of said combustion chamber whereby contact between the air entering said coils and the high temperature portion of said combustion chamber is presented.

28. A gas turbine power plant comprising an axial flow compressor having a centrally disposed rotor; an axially spaced, coaxially arranged, axial flow turbine disposed adjacent the entry end of said compressor with its entry end facing said entry end of said compressor and having a centrally disposed rotor; a shaft interconnecting the entry end of said compressor rotor and the entry end of said turbine rotor and adapting said compressor to be driven by said turbine; a side outlet compressor scroll disposed at the outlet end of said compressor in coaxial relation to said compressor and turbine and having a central opening therethrough; a main power shaft connected at one end to the outlet end of said compressor rotor and extending through said central opening in said compressor outlet scroll; a side turbine scroll disposed between the inlet end of said compressor and the inlet end of said turbine in radially spaced surrounding relation to said first mentioned shaft; at least one generally longitudinally extending combustion chamber disposed in laterally offset relation to the axes of said compressor and said turbine and connected at its respective opposite ends to said side outlet of said compressor and said side inlet of said turbine; and a turbine exhaust duct having its inlet end disposed in coaxial relation to said turbine and adapted to direct the exhaust gases away from said turbine in a predetermined direction, said first mentioned shaft being housed by an extension of said compressor housing disposed in radially spaced relation to said turbine inlet scroll and said main power shaft being housed by an annular shrouding disposed in radially spaced relation to said turbine outlet scroll, and said inlet end of said turbine rotor and said outlet end of said compressor rotor being each provided with fan blades arranged to create a flow of relatively cool ambient air longitudinally along said housing extension and shrouding respectively thereby providing a flowing barrier layer of cool air to shield said housing extension and bearing from the transmission of heat from said scrolls.

29. The combination defined in claim 28 together with sheet metal shrouding elements respectively disposed in the radial spaces between said housing extension and said turbine inlet scroll and between said annular shrouding and said compressor outlet scroll and arranged to divide said respective spaces into two paths one of which leads to the inlet of its respective fan and the other of which leads from the outlet of its respective fan and has one wall formed by its respective scroll structure whereby the respective cool flowing barrier layers of air, after extracting heat from said housing extension and annular shrouding, and said one path pass through said respective fans and are forced through said other respective paths to predetermined discharge points to extract heat from said respective scrolls and said other path to minimize the radiation of heat to said housing extension and said annular shrouding and the parts housed thereby.

30. The combination defined in claim 29 wherein the shrouding element interposed between said housing extension and said turbine inlet scroll completely encloses said turbine inlet scroll, the turbine casing, and the turbine outlet duct and provides a discharge opening leading into the exhaust duct whereby the flowing barrier layer of air after passing between said shrouding element, said inlet scroll, said turbine casing, and said turbine outlet duct is discharged into said discharge duct rather than into the ambient air thereby avoiding an undesirable increase in temperature of the ambient air.

31. In a gas turbine power plant comprising axially spaced, coaxially disposed rotary compressor and turbine units including respective outlet and inlet scrolls, at least one laterally offset, folded back combustion chamber interconnecting said compressor outlet scroll and said turbine inlet scroll: thermal protecting means comprising an annular compressor housing extension disposed between said compressor and turbine units and providing axially spaced bearing seats for receiving the turbine rotor bearing elements; bearing elements, one of which is distantly spaced from the turbine rotor and adapted to take the axial thrust developed by said turbine rotor, and the other of which is adjacent the turbine rotor and is constructed to permit limited axial displacement of its races, disposed in said bearing seats; a turbine rotor shaft, rigidly connected at one end to said turbine rotor and non-rotatably secured at its other end remote from said turbine rotor to one bearing race of said thrust bearing and having axially extending coupling splines at said end, said one end of said shaft being slidably journalled in said other bearing whereby axial elongation of said turbine rotor shaft due to temperature variations in said shaft is freely permitted without producing objectionable binding between said shaft and said bearings; and a compressor stub shaft having mating coupling splines engaged with the splined end of said turbine rotor shaft to provide a slip connection for automatically compensating for relative axial movement between said turbine rotor shaft and said stub shaft and obviating objectionable binding stresses due to varying temperatures between said turbine rotor shaft and said stub shaft.

32. The combination defined in claim 31 wherein the housing extension forms one wall of a coolant circulating passage; said turbine unit is provided with an external passage defining shrouding disposed in spaced relation to the turbine inlet scroll, turbine casing and said housing extension with one end terminating adjacent the hub of said turbine rotor to divide said space into a pair of independent coolant passages; and said turbine rotor opposite said end of said shrouding is provided with fan blades arranged to circulate relatively cool ambient air inwardly through the one of said passages formed between said housing extension and said shrouding, through said fan and past the rotor hub, and force it outwardly around said turbine inlet scroll and turbine casing through the other of said passages formed between said turbine inlet scroll and said turbine casing whereby the radiation of heat from said turbine inlet scroll turbine inlet nozzle housing, and turbine casing toward said housing extension, bearings and shaft is minimized and the heat present in said rotor body, said turbine rotor shaft and bearings, said housing extension, said turbine inlet nozzle housing, turbine inlet scroll, turbine housing, and turbine outlet scroll is effectively extracted to obviate overheating and objectionable expansion of said parts.

33. The combination defined in claim 32 wherein the turbine rotor is provided on its face adjacent the free end of said housing extension with an annular axially extending flange and the free end of said housing extension carries an annular supporting member a portion of which axially overhangs said annular flange and rigidly supports a labyrinth seal in cooperating relation to said flange and an outwardly diverging freely expansible mounting ring the free outer rim of which terminates adjacent the periphery of the turbine rotor body and is intimately secured to the inner peripheral wall of the turbine inlet nozzle housing and provides a mounting for said housing, said labyrinth seal and said mounting ring together with said annular flange and the portion of said rotor body lying outwardly of said flange forming a sealed chamber isolating the leakage path of the turbine rotor from the other of said coolant passages.

34. The combination defined in claim 33 together with conduit means connecting the interior of said chamber to the leakage path of the compressor at a point to supply relatively cool pressurized air to said chamber at a pressure just slightly in excess of the pressure of the turbine driving gases whereby leakage of the high temperature turbine driving gases along said outer portion of said rotor into said chamber and past said labyrinth seal into the other of said coolant passages is effectively prevented to further obviate objectional overheating of said turbine rotor body, the turbine rotor shaft and its supporting bearings, and the cooling air passing through said other of said passages.

35. A compact small dimensional gas turbine power plant comprising an axial flow compressor having a peripheral inlet structure at one end; a compressor outlet scroll connected to the other end of said compressor and having a side outlet passage; an axial flow turbine disposed in axially spaced coaxial relation to said one end of said compressor; shaft means connecting the inlet ends of said compressor and said turbine whereby said compressor is adapted to be driven by said turbine; a turbine inlet scroll connected to said turbine and disposed in surrounding relation to said shaft means and having a side inlet passage; a main power take-off shaft connected to said other end of said compressor and extending centrally through and beyond said compressor outlet scroll; a combined air silencer and oil cooler mounted on and disposed in substantially surrounding relation to the inlet end of said compressor and having a peripherally opening, inwardly extending arcuate recess therein; an axially extending combustion chamber disposed in said recess in spaced relation to the wall of said recess and having one end connected to and mounted on the side outlet of said compressor outlet scroll and its other end connected to and mounted on the side inlet of said turbine inlet scroll; and a turbine exhaust structure mounted on the outlet end of said turbine in coaxial relation to said turbine.

References Cited in the file of this patent

UNITED STATES PATENTS

| | | |
|---|---|---|
| 2,296,702 | Butler | Sept. 22, 1942 |
| 2,364,189 | Buchi | Dec. 5, 1944 |

(Other references on following page)

UNITED STATES PATENTS

| | | | |
|---|---|---|---|
| 2,435,990 | Weiler | Feb. 17, | 1948 |
| 2,465,846 | Clegern | Mar. 29, | 1949 |
| 2,497,151 | Clark et al. | Feb. 14, | 1950 |
| 2,510,606 | Price | June 6, | 1950 |
| 2,540,526 | Howell | Feb. 6, | 1951 |
| 2,578,481 | Lombard | Dec. 11, | 1951 |
| 2,605,611 | Wosika | Aug. 5, | 1952 |
| 2,631,796 | Williamson et al. | Mar. 17, | 1953 |
| 2,632,396 | Koskinen | Mar. 24, | 1953 |
| 2,689,682 | Boyd et al. | Sept. 21, | 1954 |
| 2,704,434 | Schmitt | Mar. 22, | 1955 |
| 2,743,053 | Gregory et al. | Apr. 24, | 1956 |

FOREIGN PATENTS

| | | | |
|---|---|---|---|
| 484,289 | Great Britain | May 3, | 1938 |
| 861,149 | France | Oct. 22, | 1940 |
| 936,704 | France | Feb. 23, | 1948 |

UNITED STATES PATENT OFFICE
CERTIFICATE OF CORRECTION

Patent No. 2,801,518                                          August 6, 1957

Leon R. Wosika et al.

It is hereby certified that error appears in the printed specification of the above numbered patent requiring correction and that the said Letters Patent should read as corrected below.

Column 5, line 41, for "anular" read -- annular --; column 8, line 67, for "quaters" read -- quarters --; column 14, line 30, for "connected" read -- connection --; column 15, line 45, for "suport" read -- support --; column 16, line 43, for "presented" read -- prevented --.

Signed and sealed this 5th day of November 1957.

(SEAL)

Attest:

KARL H. AXLINE

Attesting Officer

ROBERT C. WATSON
                                                                                 Commissioner of Patents